United States Patent [19]

Devillard

[11] 3,949,026
[45] Apr. 6, 1976

[54] METHOD OF FABRICATION OF FUEL ELEMENTS FOR NUCLEAR REACTORS

[75] Inventor: Jacques Devillard, St-Ismier, France

[73] Assignee: Commissariat a l'Energie Atomique, Paris, France

[22] Filed: Oct. 24, 1973

[21] Appl. No.: 410,003

Related U.S. Application Data

[63] Continuation-in-part of Ser. No. 352,732, April 19, 1973, abandoned.

[30] Foreign Application Priority Data

Apr. 25, 1972  France .......................... 72.14642

[52] U.S. Cl. ............. 264/.5; 176/91 R; 252/301.1 R
[51] Int. Cl.$^2$ .......................................... G21C 21/00
[58] Field of Search .......... 264/.5, 29; 252/301.1 R; 176/71, 91

[56] References Cited
UNITED STATES PATENTS

| | | | |
|---|---|---|---|
| 1,137,373 | 4/1915 | Aylsworth | 252/511 |
| 3,173,973 | 3/1965 | Brockway | 264/.5 |
| 3,212,989 | 10/1965 | Fitzer et al. | 176/91 R X |
| 3,258,317 | 6/1966 | Brearton | 264/.5 |
| 3,331,897 | 7/1967 | Accary | 264/.5 |
| 3,344,211 | 9/1967 | Redding et al. | 269/.5 |
| 3,439,073 | 4/1969 | Howard et al. | 264/.5 |
| 3,472,734 | 10/1969 | Boettcher | 176/71 |
| 3,488,409 | 1/1970 | Beutler | 264/.5 |
| 3,668,283 | 6/1972 | Moreau | 176/71 X |
| 3,792,136 | 2/1974 | Schmitt | 264/.5 X |

Primary Examiner—Samuel Feinberg
Assistant Examiner—Harold Tudor
Attorney, Agent, or Firm—Flynn & Frishauf

[57] ABSTRACT

A graphite jacket for a fuel element for nuclear reactors is made by placing a dry mixture of graphite and a powdered thermosetting resin in a mold without application of pressure and heating said mixture to thermoset said resin and then subjecting to a coking treatment. The coked jacket is then filled with a mixture of fissile particles and graphite and the complete assembly is closed and treated with a gaseous hydrocarbon at an elevated temperature to deposit pyrolytic carbon.

8 Claims, No Drawings

METHOD OF FABRICATION OF FUEL ELEMENTS FOR NUCLEAR REACTORS

This application is a continuation-in-part of U.S. Pat. Application Ser. No. 352,732 filed on Apr. 19, 1973 which is now abandoned.

This invention relates to a method of fabrication of nuclear reactor fuel elements which are primarily intended for use in high-temperature reactors.

In general, the fuels currently employed in reactors of this type are made up of spherical particles of uranium oxide or uranium carbide which are bonded together by a mixture of graphite and thermosetting resin. Fuels of this type are placed within a graphite sheath or jacket. The methods of fabrication of these elements are attended by a number of drawbacks, in particular the need to subject the fuel to high pressures in order to permit polymerization of the resin and shaping of the element. Furthermore, a substantial temperature difference is developed between the jacket and the graphite at the time of operation of said elements.

Among the different methods of fabrication of fuel elements which have been known up to the present time, mention can be made of the method described in French Pat. No. 1,588,611 filed on Sept. 23, 1968 by Commissariat à l'Energie Atomique, in which a graphite jacket obtained by extrusion is filled with fuel particles coated with a layer of graphite by spraying a mixture containing the graphite and an organic diluent.

The practical application of the method according to the present invention is more straightforward. The high degree of porosity of the raw fuel element is such that the gas can readily penetrate throughout the fuel element. Finally, the method permits the fabrication of fuel elements of substantial length (lengths of 50 to 100 cm can readily be achieved).

The method according to the invention meets technical requirements more effectively than those referred-to in the foregoing, particularly insofar as fuel elements having good characteristics can accordingly be obtained by virtue of the initial porosity of the semi-finished products.

The method under consideration is characterized in that a jacket is fabricated by moulding in the dry state and without application of pressure a mixture of graphite and powdered resin and said jacket is subjected to a coking treatment; said jacket is then filled with a mixture of fissile particles and of graphite; the complete assembly thus obtained is then closed and treated with a gaseous hydrocarbon.

According to one advantageous feature of the invention, the treatment which consists in coking the jacket is followed by a treatment of impregnation with a stream of gaseous hydrocarbon prior to filling of said jacket with the fuel particles. This treatment permits better consolidation of the jacket.

According to another feature of the invention, the resin used as a constituent of the mixture which is intended to form the jacket is a phenolic resin.

The method according to the invention is carried out in the following manner.

A mixture of graphite having a suitable particle size and of powdered resin is placed in an aluminium mould. The mould is heated in an oven to 300°C in order to obtain polymerization of the mixture.

The jacket which is thus obtained is then heated to 900°C in a nitrogen atmosphere in order to ensure that coking of the jacket is carried out.

This coking treatment can be extended by impregnation of the jacket at the same temperature in a stream of gaseous hydrocarbon such as methane, for example. At this stage, the majority of the pores of the jacket have a diameter within the range of 30 to 50 $\mu$.

Said jacket is then filled with a selected mixture of fuel particles and of graphite; the particle size distribution of said graphite is comprised between 0 and 125 $\mu$ and can have different values for the same mixture. This mixture is carried out in the dry state or in wet phase, for example in an alcohol.

In order to facilitate the obtainment of a fuel mixture having contiguous particles, a solid or hollow core having the same composition as the jacket can be placed at the center of this latter if so required. In the case of a given ratio of fissile material to graphite, the diameter of the core is chosen so as to have particles which are in close contact with each other.

After the fuel mixture has been placed within the jacket, said mixture is subjected to light vibrations without application of pressure.

The jacket thus obtained is then closed by a plug formed from a paste which exhibits a low degree of shrinkage at the time of baking. This paste consists of graphite and of an aqueous binder.

The fuel element thus constituted is then heated to a temperature within the range of 700°C and 1000°C in a stream of gaseous hydrocarbon (such as methane, propane, propene, for example).

The method according to the invention makes it possible to obtain fuel elements of homogeneous density within the range of 1.5 to 2 without any marked discontinuity between the jacket and the fuel. Moreover, the raw fuel elements considered as semi-finished products, that is to say prior to densification, which are obtained by means of the method according to the invention have a uniformly distributed porosity. This permits uniform impregnation of the element with the gaseous hydrocarbons without any filling of pores with excessive deposits of pyrolytic carbon. Moreover, the total residual coke yield remains of low value, namely of the order of 3 to 5 %.

Since the jacket is obtained by moulding, and depending on the application which is contemplated, it is an easy matter to fabricate fuel elements having centering fins, external cooling fins, internal heat distribution fins, or either a solid or hollow core.

One embodiment of the method according to the invention will now be given hereinafter by way of example without thereby implying any limitation of the invention.

a. Fabrication of the jacket:
a graphite powder (particle size within the range of 80 to 125 $\mu$) is mixed in the dry state with 20 % by weight of a phenolic resin,
an aluminium mould which has previously been coated with a lubricant is filled with this mixture while being subjected to vibrations in the cold state,
the mixture is heated in a hot-air oven at 300°C,
the jacket is removed from the mould and then has a density of approximately 0.72,
coking is carried out in a nitrogen atmosphere at 900°C, consolidation is carried out by means of a treatment at 900°C with methane over a period of 5 hours (velocity of the methane stream: 6 cm/sec.).

The jacket finally obtained then has a density of approximately 0.70 and a total open pore volume of 70 %.

b. Fabrication of the fuel element:

the jacket is filled while being subjected to vibrations with a mixture of 60 % of fuel particles (particle diameter of 1100 $\mu$) and of 40 % graphite (in which a proportion of 20 % has a particle size within the range of 0 to 80 $\mu$ and in which a proportion of 80 % has a particle size within the range of 80 to 125 $\mu$), the complete assembly is closed by a plug fabricated from a graphite paste (having a particle size within the range of 80 to 125 $\mu$) to which are added 2 % polysaccharides, the fuel element is impregnated with propane at 940°C over a period of 10 hours (velocity of the propane stream: 1 cm/sec.), there is thus obtained a fuel element in which the carbonaceous matrix has a density of 1.6.

The fuel elements obtained by means of the method according to the invention can also be employed in water-cooled reactors of the pressurized-water or boiling water type.

The powdered resins are preferably thermosetting resins such as urea formaldehyde, epoxydes, melamine formaldehyde, polyurethanes, phenol-formaldehyde and polyesters. The resin used in the example is a phenol-formaldehyde resin of the type sold under the trademarks "Resophene PB 105", "Resophene PL 353", "Resophene PL 149", by the Promedo Co and "Resin TPR" by Borden Chemical Co. The mixture of resin and graphite is heated to thermoset the resin which holds the mass together until the subsequent coking operation.

The deposition of carbon by cracking of the gaseous hydrocarbon is disclosed in report CEA-R 2535 "Fabrication et propriétés de corps carbonés préparés par craquage de gaz naturel" 1964 available at Documentation Française, Secrétariat Général, Direction de la Documentation, which is incorporated herein in its entirety. Said treatment is effected in a furnace, for example in an electrical furnace, preferably a high frequence induction furnace. Gaseous hydrocarbon or mixture of gaseous hydrocarbons such as methane, butane, propane, propene, etc.. are injected into said furnace. The element situated in the furnace is consequently in contact with the gaseous hydrocarbon stream. The velocity of said stream is a few cm/sec and the temperature is between 700° and 1000°C.

What we claim is:

1. A method for making a fuel element assembly comprising a graphite jacket containing fissle material for a high temperature nuclear reactor comprising moulding a jacket by placing at atmospheric pressure without application of pressure a dry mixture of graphite and a powdered thermosetting resin in a mould and heating said mixture to thermoset said resin so that it holds the mass of thermoset resin and graphite together, said thermosetting resin being selected from the group consisting of urea formaldehyde, epoxides, melamine formaldehyde, polyurethanes, phenol-formaldehyde, and polyesters, coking said moulded jacket of thermoset resin and graphite to form a porous jacket, filling said coked moulded jacket with a mixture of particles of fissile material and graphite to obtain the said fuel element assembly, and closing said assembly and impregnating said closed assembly with a gaseous hydrocarbon at elevated temperature to deposite pyrolytic carbon in the pores of said jacket.

2. A method according to claim 1, wherein the resin is phenol-formaldehyde.

3. A method according to claim 2, wherein the treatment which consists in coking the jacket is carried out in a nitrogen atmosphere at a temperature of 900°C.

4. A method according to claim 2, wherein the jacket is impregnated after coking with a stream of gaseous hydrocarbon.

5. A method according to claim 4, wherein a graphite having a particle size within the range of 80 to 125 $\mu$ is employed for the fabrication of the jacket.

6. A method according to claim 5, wherein the resin is added to the graphite in a proportion of 20 % by weight.

7. A method according to claim 6, wherein moulding of the jacket is carried out by thermosetting said resin at a temperature of 300°C.

8. A fuel element as fabricated by the method defined in claim 1.

* * * * *